Figure 1:
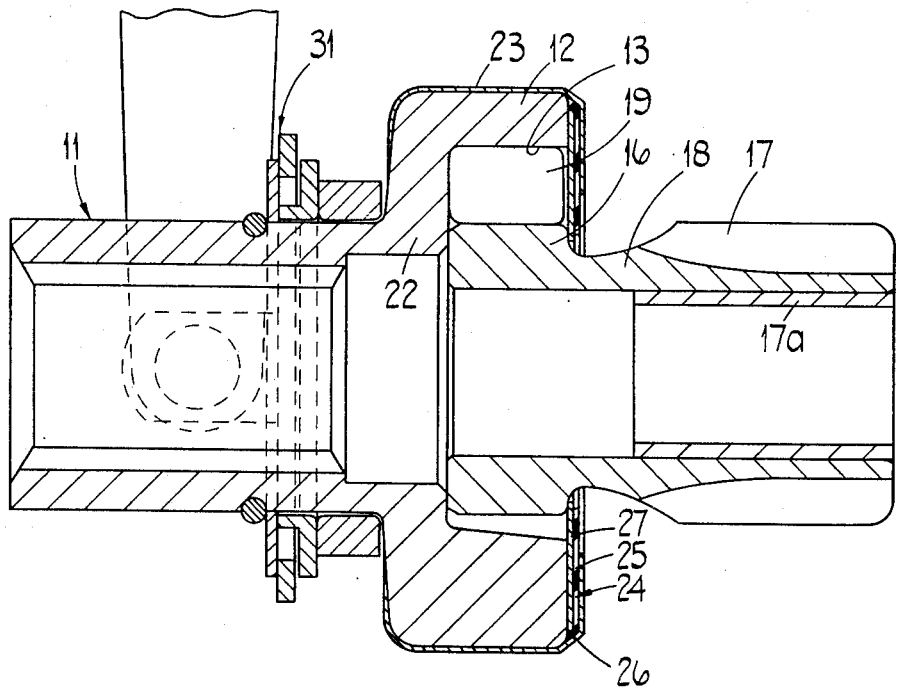

United States Patent [19]

Bowcott

[11] 3,965,754

[45] June 29, 1976

[54] ROLLER CLUTCH ASSEMBLY

[75] Inventor: Roy Price Bowcott, Solihull, England

[73] Assignee: The Lucas Electrical Company Limited, Birmingham, England

[22] Filed: Apr. 28, 1975

[21] Appl. No.: 572,019

[30] Foreign Application Priority Data

May 15, 1974 United Kingdom............... 21540/74

[52] U.S. Cl............................................ 74/6; 192/45
[51] Int. Cl.² .................... F02N 15/06; F16D 41/06
[58] Field of Search .............. 192/42, 45; 74/6, 7 R, 74/7 A

[56] References Cited
UNITED STATES PATENTS

| | | | |
|---|---|---|---|
| 3,140,617 | 7/1964 | Palmer | 74/6 |
| 3,460,655 | 8/1969 | Bowcott | 192/45 |

Primary Examiner—Allan D. Herrmann
Attorney, Agent, or Firm—Olson, Trexler, Wolters, Bushnell & Fosse, Ltd.

[57] ABSTRACT

A roller clutch assembly for use in an internal combustion engine starter motor. The assembly includes a clutch outer member which is arranged to be driven and a clutch inner member which carries a pinion gear wheel. The clutch inner member and the pinion gear wheel are arranged as parts of a common member having a radial shoulder between the inner member and the gear wheel. A plurality of rollers lie between the inner and outer clutch members and a plurality of compression springs each urge a respective roller in a circumferential direction. An annular washer is carried by the outer clutch member and abuts the shoulder to prevent disengagement of the clutch inner member from the clutch outer member. The washer is formed in at least two parts and the parts defining the washer are so shaped that the abutting edges of the parts are disposed other than parallel to the convulsions of the springs.

6 Claims, 3 Drawing Figures

ROLLER CLUTCH ASSEMBLY

This invention relates to a roller clutch assembly for use in an internal combustion engine starter motor, the assembly being of the kind including clutch outer member arranged to be driven, a clutch inner member carrying a pinion gear wheel with a radial shoulder between said inner member and said gear wheel, a plurality of rollers between said inner and outer members, a plurality of compression springs, each spring urging a respective roller in a circumferential direction, and an annular washer, formed in at least two parts, the washer being carried by the outer clutch member and abutting said shoulder so as to retain the inner clutch member within the outer clutch member.

In a conventional assembly of the kind specified the washer is defined by a pair of half washers having abutting edges radially disposed. The compression springs, since they act circumferentially, have their convolutions disposed generally radially and it is found that in certain circumstances a convolution of a spring can become lodged between abutting edges of the two washer parts whereupon the operation of the clutch is deleteriously affected. It is an object of the present invention to provide a roller clutch assembly wherein this problem is minimised.

According to the invention, in a roller clutch assembly of the kind specified the parts defining said washer are so shaped that the abutting edges of the parts are disposed other than parallel to the convolutions of said springs.

Preferably said abutting edges are disposed other than radially of the inner and outer clutch members.

Desirably the washer is defined by a pair of parts.

Conveniently said washer parts are identical so that each part can be stamped from strip material by the same, or an identical tool.

Preferably the washer is part of a combined seal and washer, the seal being a flexible annular member coaxial with the washer.

Figure 2:
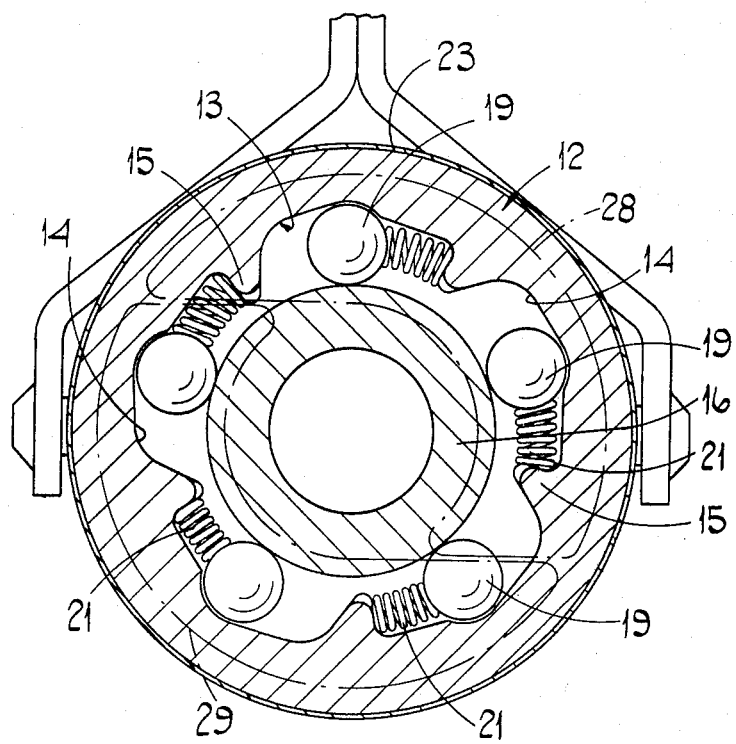
Figure 3:
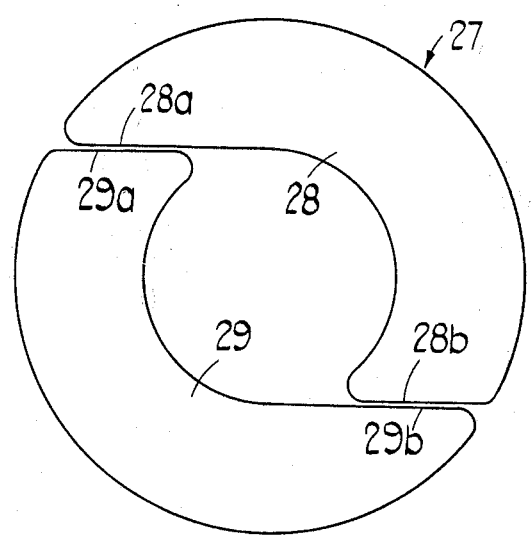

One example of the invention is illustrated in the accompanying drawings wherein, FIG. 1 is a longitudinal sectional view of a roller clutch assembly, FIG. 2 is a transverse sectional view of the assembly shown in FIG. 1, but having superimposed thereon the outline of a retaining washer, and FIG. 3 is a plan view of the retaining washer shown in outline in FIG. 2.

Referring to the drawings, the roller clutch assembly includes a cylindrical, hollow clutch outer member 12 formed as an integral part of an elongate cylindrical sleeve 11. The inner surface 13 of the member 12 is shaped to provide a plurality of angularly spaced ramp surfaces 14 and spring abutments 15. Extending into the outer member 12 is a cylindrical clutch inner member 16 which is also hollow, and which has integral therewith a pinion gear wheel 17. The gear wheel 17 and the inner member 16 are coaxial, and are interconnected by an integral neck 18 of reduced diameter.

Disposed between the outer surface of the member 16 and the inner surface of the member 12 are a plurality of cylindrical rollers 19 having their axes parallel to and spaced around the common axis of the sleeve 11, members 12, 16 and the pinion gear wheel 17. The rollers 19 locate the member 16 concentrically with the member 12. Extending circumferentially of the assembly, and acting between each abutment 15 and the adjacent roller 19 is a respective helically coiled compression spring 21. Since each of the springs 21 acts in a circumferential direction then the individual convolutions of each spring 21 will be disposed generally radially of the assembly.

The clutch inner member 16 is retained against axial movement relative to the outer member 12 in one direction by an internal abutment 22 and is retained against axial movement in the opposite direction through the intermediary of an outer casing 23. The casing 23 is spun over to engage the face of the member 12 remote from the pinion 17, and also spun over at its opposite end to partially overlie the open end of the member 12. Trapped between the casing and the open end of the member 12 is a combined seal and washer 24.

The combined seal and washer 24 comprises an annular flexible seal 25 having an integral bead 26 at its outer peripheral edge. Secured to the face of the seal 25 presented to the member 12 is a steel washer 27 formed of a pair of identical parts 28, 29. The two parts 28, 29 when positioned correctly with respect to one another define an annular washer substantially identical in shape to the annular seal 24, the seal 25 and washer 28, 29 having their axes coextensive. The combined seal and washer abuts the open end of the member 12, and is trapped by the cover 23. Additionally, the combined seal and washer extends radially inwardly into the neck 18, and so abuts also the inner clutch member 16. The washer 27 thus abuts the inner and outer clutch members, and overlies the rollers 19 and springs 21.

It is necessary to construct the washer 27 in at least two parts to permit assembly of the washer to the clutch inner member 16, which has the pinion 17 integral therewith. Thus the two parts 28, 29 of the washer are adhesively bonded to the flexible seal 25 so that the seal retains them in the correct relative positions, the seal being sufficiently flexible to permit the combined seal and washer to be distorted to pass over the clutch inner member 16, or the pinion 17, in order to locate in the reduced region of the neck 18.

For convenience the two washer parts 28, 29 are identical, so that they can be produced by the same, or by an identical, stamping tool from sheet steel. In the past it has been the practice to produce the two parts of the washer in the form which they would take had a single part washer been bisected along a diameter. However, such an arrangement when assembled results in the abutting edges of the two washer parts being disposed radially with respect to the assembly, that is to say, parallel to the convolutions of the springs 21. It has been found in certain circumstances that with such an arrangement a convolution of a spring can become lodged between the abutting edges of the two washer parts thereby deleteriously affecting the operation of the assembly. Accordingly, the parts 28, 29 of the washer 27 are so shaped that their abutting edges 28a, 29a and 28b, 29b are disposed other than radially of the assembly. The parts are however identical in shape, and so can be stamped from sheet material by the same stamping tool. Since the abutting edges of the parts 28, 29 do not extend radially of the assembly, and are therefore not parallel to any convolution of a spring 21 then the possibility of a convolution of a spring 21 becoming lodged between the abutting edges is drastically reduced.

The roller clutch assembly described above is utilized in the conventional manner, in a starter motor for an internal combustion engine. The inner surface of the sleeve 11 is formed with helical splines, which mate, in use, with helical splines on the exterior of the rotor shaft of the starter motor. The rotor shaft extends through the sleeve 12, and through the pinion 17 the pinion 17 being formed internally with a bearing sleeve 17a. A connecting arrangement 31 is provided whereby the roller clutch assembly is coupled to an electromagnet associated with the starter motor, and upon energisation of the electromagnet the roller clutch assembly is moved, by way of the arrangement 31, along the rotor shaft to engage the pinion 17 with a ring gear of the associated internal combustion engine. The relative axial movement between the roller clutch assembly and the rotor shaft results in relative angular movement of the assembly and the rotor shaft by virtue of the helical splines.

When the starter motor is energised the roller clutch assembly rotates with the rotor shaft, the pinion 17 being driven from the rotor shaft by way of the roller clutch which transmits drive in that direction. However, should the engine with which the starter motor is associated fire, and commence to run then the pinion 17 may be driven by the engine at a speed faster than that at which it is being driven by the starter motor, and the roller clutch will slip to permit relative angular movement between the inner and outer members of the clutch so that the engine does not drive the starter motor. Similarly, should the pinion gear wheel 17 remain engaged in the ring gear after the engine has started, and the starter motor has been de-energised then again the roller clutch will slip to prevent the starter motor being driven by the engine.

It should be noted that in order to facilitate assembly of the combined seal and washer to the clutch inner member 16 the washer parts 28, 29 are adhesively bonded to the seal at localized points only, and not over the whole of their area.

In a modification the pinion 17 is of relatively small diameter by comparison with the member 16 and no reduced diameter neck 18 is provided. The difference in diameter between the two parts results in a radial shoulder at their junction and the washer 28, 29 abuts this radial shoulder to retain the member 17 within the member 12. It is recognised that in such an arrangement the two part washer is not essential to enable assembly and a unitary washer could be used however it is preferred to use the two part washer in order to standardize as many components as possible throughout the range of roller clutch assemblies.

I claim:

1. A roller clutch assembly including a clutch outer member arranged to be driven, a clutch inner member carrying a pinion gear wheel, a radial shoulder between said inner member and said gear wheel, a plurality of rollers disposed between said inner and outer members, a plurality of compression springs, each spring urging a respective roller in a circumferential direction and, an annular washer, said washer being formed in at least two parts and being carried by the outer clutch member, said washer abutting said radial shoulder so as to retain the inner clutch member within the outer clutch member, and the parts defining said washer being so shaped that the abutting edges of the parts are disposed other than parallel to the adjacent convolutions of said springs.

2. An assembly as claimed in claim 1 wherein said abutting edges are disposed other than radially of the inner and outer clutch members.

3. An assembly as claimed in claim 1 wherein the washer is defined by a pair of parts.

4. An assembly as claimed in claim 1 wherein said washer parts are identical so that each part can be stamped from strip material by the same, or an identical tool.

5. An assembly as claimed in claim 1 wherein the washer is part of a combined seal and washer, the seal being a flexible annular member coaxial with the washer.

6. An assembly as claimed in claim 1 wherein said shoulder is one wall of a neck of reduced diameter between the gear wheel and the clutch inner member.

* * * * *